(12) United States Patent
Bu et al.

(10) Patent No.: US 8,837,483 B2
(45) Date of Patent: Sep. 16, 2014

(54) MAPPING PRIVATE AND PUBLIC ADDRESSES

(75) Inventors: Tian Bu, Basking Ridge, NJ (US); Yao Zhao, Oakland, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 543 days.

(21) Appl. No.: 13/084,050

(22) Filed: Apr. 11, 2011

(65) Prior Publication Data

US 2012/0257628 A1 Oct. 11, 2012

(51) Int. Cl.
- H04L 12/28 (2006.01)
- H04L 12/56 (2006.01)
- H04L 12/801 (2013.01)
- H04L 29/12 (2006.01)
- H04L 12/701 (2013.01)
- H04L 29/06 (2006.01)

(52) U.S. Cl.
CPC ............ *H04L 61/2567* (2013.01); *H04L 47/10* (2013.01); *H04L 45/00* (2013.01); *H04L 61/2514* (2013.01); *H04L 29/0653* (2013.01)
USPC .......................................................... 370/392

(58) Field of Classification Search
USPC ....................................................... 370/392
IPC ............................... H04L 45/00,29/0653, 47/10
See application file for complete search history.

(56) References Cited

U.S. PATENT DOCUMENTS

| | | | | |
|---|---|---|---|---|
| 6,535,511 | B1 * | 3/2003 | Rao | 370/392 |
| 6,993,595 | B1 * | 1/2006 | Luptowski et al. | 709/245 |
| 7,139,841 | B1 * | 11/2006 | Somasundaram et al. | 709/245 |
| 7,478,169 | B2 * | 1/2009 | Banerjee et al. | 709/245 |
| 7,577,144 | B2 * | 8/2009 | Chang et al. | 370/392 |
| 2005/0086373 | A1 | 4/2005 | Banerjee et al. | |

OTHER PUBLICATIONS

Rosenberg et al., "STUN—Simple Traversal of UDP Through NATs", RFC 3489, Mar. 2003.*
Rosenberg J. Weinberger Dynamicsoft C Huitema Microsoft R Mahy Cisco J: Stun-Simple Traveral of User Datagram Protocol (UDP) Through Network Address Translators (NATs); Mar. 1, 2003.
International Search Report for PCT/US2012/032780 dated Apr. 9, 2012.

* cited by examiner

*Primary Examiner* — Ayaz Sheikh
*Assistant Examiner* — Blanche Wong
(74) *Attorney, Agent, or Firm* — Kramer & Amado, P.C.

(57) ABSTRACT

Various exemplary embodiments relate to a method and related network node including one or more of the following: identifying, at the network node, a packet associated with a first address; determining, at the network node, that an alternate address mapping is unknown to the network node for the first address; generating a request message based on at least a portion of the packet; transmitting the request message to a different node; receiving a response message, the response message including a second address, wherein the second address is an alternative address for the first address; and storing the first address and the second address together as an alternate address mapping.

39 Claims, 5 Drawing Sheets

300

| | Flow ID | Private Address | Public Address |
|---|---|---|---|
| 340 | 0x5F65 | 192.168.1.4/22 | 135.112.2.13/47 |
| 350 | 0x6231 | 192.168.1.3/80 | 135.112.2.13/80 |
| 370 | ... | ... | ... |

| Packet ID | Private Address |
|---|---|
| 0x4E3D | 192.168.1.4/22 |
| 0x502B | 192.168.1.3/80 |
| 0x7AD3 | 192.168.1.2/1234 |
| ... | ... |

MAPPING PRIVATE AND PUBLIC ADDRESSES

TECHNICAL FIELD

Various exemplary embodiments disclosed herein relate generally to network addressing.

BACKGROUND

The core network layer protocol for the Internet, as well as numerous other networks, is currently Internet Protocol (IP) version 4. Under implementations of IPv4, each node on a network is associated with at least one IP address consisting of 32 bits. As such, the address space for IPv4 is limited to a finite number of addresses. While this address space was sufficiently large to accommodate the relatively small number of devices attached to the Internet in the past, as the Internet became widely adopted by numerous users, it became apparent that the address space would soon prove insufficient. Further, complex organization would be necessary if each device connected to such a large network were to be given a unique IP address.

In order to help meet these challenges, network address translation (NAT) technology was introduced. Using this method, a number of different devices could share a single IP address. These devices would have different private IP addresses from their own point of view, while sharing a single public IP address. Such sharing may be effected by dividing the logical ports associated with a public IP address between the devices.

To implement NAT, a NAT device is used to maintain a correspondence between public IP-port pairs and private IP-port pairs. When the NAT device receives an outgoing message from one of the devices, it swaps the source address and port in the message with the corresponding public IP address and port. Likewise, when the NAT device receives an incoming message, it swaps the destination address and port in the message with the corresponding private IP address and port. NAT devices are deployed at many different levels of the Internet, whether it be at a lower-tier Internet Service Provider (ISP) to effectively utilize a pool of IP addresses allocated to that ISP or in a home router to provide Internet access to a number of home devices using a single public IP address.

SUMMARY

Various exemplary embodiments relate to a method performed by a network node for determining an alternate address mapping, the method including one or more of the following: identifying, at the network node, a packet associated with a first address; determining, at the network node, that an alternate address mapping is unknown to the network node for the first address; generating a request message based on at least a portion of the packet; transmitting the request message to a different node; receiving a response message, the response message including a second address, wherein the second address is an alternative address for the first address; and storing the first address and the second address together as an alternate address mapping.

Various exemplary embodiments relate to a network node adapted to determine an alternate address mapping, the network node including one or more of the following: an address mapping storage for storing at least one mapping between two addresses; an interface for communicating with a different node; an alternate address identifier for: identifying a packet associated with a first address, and determining that the address mapping storage does not store a mapping for the first address; a request message generator for: generating a request message based on at least a portion of the packet, and transmitting the request message to the different node via the interface; and a response message interpreter for: receiving a response message from the different node via the interface, the response message including a second address, wherein the second address is an alternative address for the first address, and instructions for storing the first address and the second address together in the address mapping storage.

Various exemplary embodiments relate to a machine-readable storage medium encoded with instructions for execution by a network node for determining an alternate address mapping, the machine-readable storage medium including one or more of the following: instructions for identifying, at the network node, a packet associated with a first address; instructions for determining, at the network node, that an alternate address mapping is unknown to the network node for the first address; instructions for generating a request message based on at least a portion of the packet; instructions for transmitting the request message to a different node; instructions for receiving a response message, the response message including a second address, wherein the second address is an alternative address for the first address; and instructions for storing the first address and the second address together as an alternate address mapping.

Various alternative embodiments are described wherein the request message includes at least one of the packet, at least one additional packet, at least one field of the packet, and a hash of at least a portion of the packet. Various alternative embodiments are described wherein: at least one of the network node and the different node is at least one of a source and a destination for the packet. Various alternative embodiments are described wherein: the first address is associated with the packet on a first side of a first network address translation (NAT) device; and the second address is associated with the packet on a second side of a second NAT device. Various alternative embodiments are described wherein the first NAT device and the second NAT device are the same device. Various alternative embodiments are described wherein: the first address includes a first IP address and a first port; and the second address includes a second IP address and a second port.

Various exemplary embodiments relate to a method performed by a network node for determining an alternate address mapping, the method including one or more of the following: receiving, at the network node from a different node, a request message, the request message including an indication of a packet; identifying a first address associated with the packet based on the indication of the packet; constructing a response message, the response message including the first address; and transmitting the response message to the different node.

Various exemplary embodiments relate to a network node for determining an alternate address mapping, the network node including one or more of the following: a packet cache for storing a number of packets; an interface for communicating with a different node; a request message interpreter for: receiving, from a different node via the interface, a request message, the request message including an indication of a packet, identifying a first address associated with the packet based on the indication of the packet; and a response message generator for: constructing a response message, the response message including the first address, and transmitting the response message to the different node.

Various exemplary embodiments relate to a machine-readable storage medium encoded with instructions for execution by a network node for determining an alternate address mapping, the machine-readable storage medium including one or more of the following: instructions for receiving, at the network node from a different node, a request message, the request message including an indication of a packet; instructions for identifying a first address associated with the packet based on the indication of the packet; instructions for constructing a response message, the response message including the first address; and instructions for transmitting the response message to the different node.

Various alternative embodiments are described wherein the indication of a packet is at least one of: the packet, a portion of the packet, at least one header field from the packet, and a hash of at least a portion of the packet. Various alternative embodiments are described wherein the step of identifying the first address includes one or more of the following: performing a hash function on at least a part of the indication of the packet to produce a hash key; and using the hash key to locate a previously stored packet. Various alternative embodiments are described wherein: the request message includes a second address; and the response message includes the second address. Various alternative embodiments are described wherein at least one of the network node and the different node is at least one of a source and a destination for the packet.

Various alternative embodiments include one or more of the following: before receiving the request message, receiving the packet; storing at least a portion of the packet in a packet cache, wherein the step of identifying a first address associated with the packet includes one or more of the following extracting the first address from the at least a portion of the packet. Various alternative embodiments are described wherein the indication of the packet includes fields from a packet that are not modified by a network address translation device.

BRIEF DESCRIPTION OF THE DRAWINGS

In order to better understand various exemplary embodiments, reference is made to the accompanying drawings, wherein.

DETAILED DESCRIPTION

Figure 1:
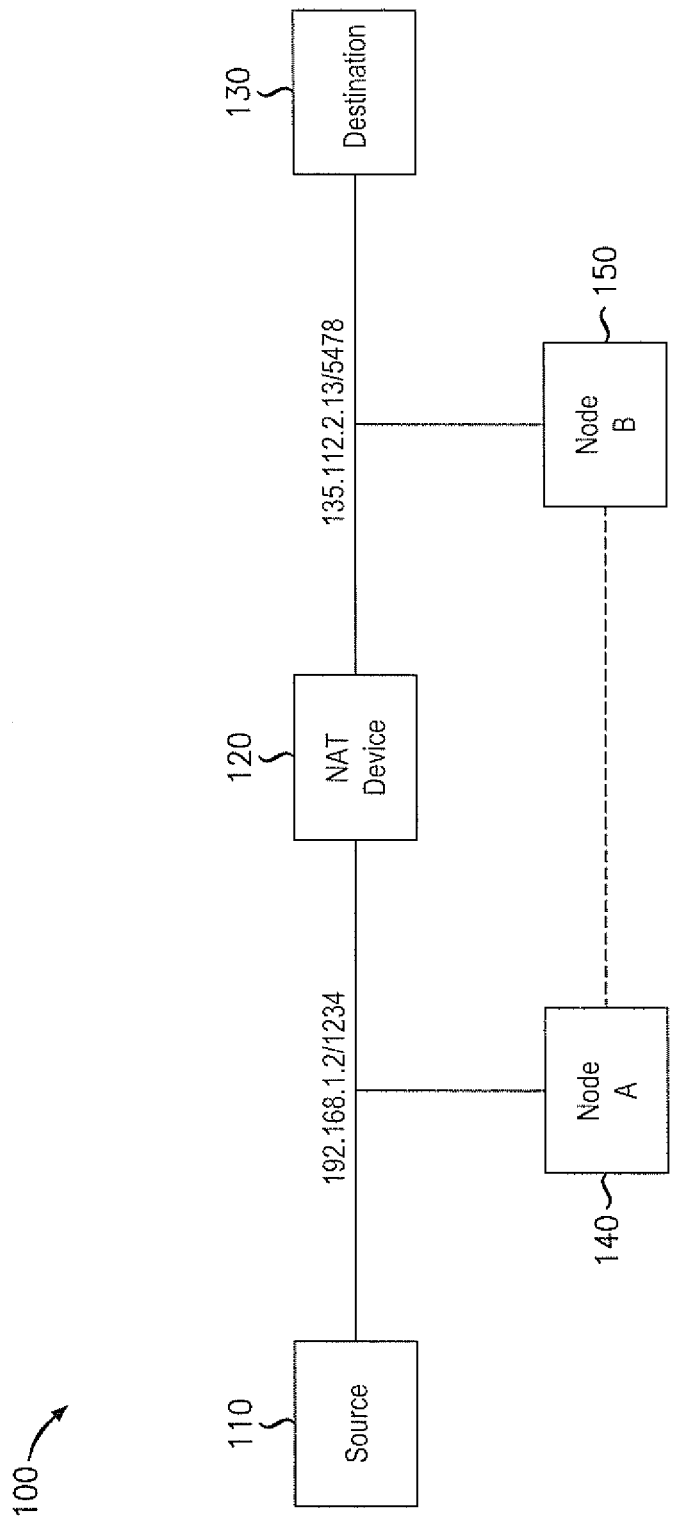
FIG. 1 illustrates an exemplary network for providing communication between two nodes.

Various network applications may require or otherwise specify that two devices should communicate with regard to a device or packet flow. For example, a monitoring node may wish to indicate to a traffic control node that a particular flow is using too much of the available bandwidth and should consequently be restricted. If these two nodes are viewing the packet flow from different sides of a network address translation (NAT), however, they will likely see different addresses associated with the flow and therefore have difficulty identifying the flow when communicating with each other. In the above example, if the monitoring node only knows a public address for an endpoint and the traffic control node only knows the private address for the endpoint, the monitoring node may have difficulty conveying which flow should be restricted in a manner that will be understood by the traffic control node. Accordingly, there exists a need for a method of determining the mapping between private and public addresses.

It should be noted that, while various examples described herein apply to NAT, the methods described may be applicable to any system wherein description coherency among multiple nodes is desired. Accordingly, the terms "private address" and "public address" should be understood to refer generally to two separate pieces of descriptive information. It should further be apparent that, within embodiments relating to NAT, while the described embodiments relate to a node requesting a private address from a node on the other side of a NAT device, the described methods may be applied to the reverse process. Particularly, in various embodiments, a node may instead request a public address from another node. Further, in various embodiments, a node may be both capable of generating requests for one of the address types while fulfilling requests for the other of the address types. Various modifications to effect such embodiments will be apparent to those of skill in the art.

Referring now to the drawings, in which like numerals refer to like components or steps, there are disclosed broad aspects of various exemplary embodiments.

FIG. 1 illustrates an exemplary network 100 for providing communication between two nodes. Network 100 may be a portion of a packet-switched network such as, for example, the Internet. It should be apparent that network 100 is in some respects a simplification and may contain numerous additional nodes and/or intermediate nodes between the illustrated devices. Network 100 may include source 110, network address translation (NAT) device 120, destination 130, node A 140, and node B 150.

Source 110 may be any device adapted to communicate with other devices over a packet-switched network. For example, source 110 may be a personal computer, laptop, mobile device, tablet, server, router, or any other device capable of network communication. As such, source 110 may have at least one network interface, to which is assigned a network address, such as an IP address. Source 110 may be an endpoint for numerous flows. For the purposes of illustration, it will be assumed that there is currently a flow between source 110 and destination 130. For example, source 110 may be serving a file to destination 130.

NAT device 120 may be a device adapted to provide network address translation for source 110 (or, in various alternative embodiments, destination 130). As such, source 110 may appear to have a different IP address on one side of NAT device 120 than on the other side. For example, packets belonging to the flow between source 110 and destination 130 may include a source address of "192.168.1.2" and a source port of "1234" before such packets reach NAT device 120. After NAT device 120 modifies the packets for transmission to destination 130, the packets may instead include a source address of "135.112.2.13" and a source port of "5478." Thus, source 110 is associated with a private 2-tuple of "192.168.1.2/1234" and a public 2-tuple of "135.112.13/5478." NAT device 120 may perform a similar and reversed process for packets sent from destination 130 to source 110.

NAT device 120 may leave many fields of the packets unmodified. For example, upon receiving a packet belonging to the flow between source 110 and 130, NAT device 120 may forward the packet without modifying the destination address, destination port, and fragment identifier. NAT device 120 may further refrain from modifying the payload of the packet.

Destination 130 may be any device adapted to communicate with other devices over a packet-switched network. For example, destination 130 may be a personal computer, laptop, tablet, mobile device, server, router, or any other device capable of network communication. As such, destination 130 may have at least one network interface, to which is assigned a network address, such as an IP address.

Node A 140 may be a device that provides some network service. As illustrated, node A 140 is an off-line device which receives packets transmitted between source 110 and NAT device 120. For example, node A 140 may monitor traffic for anomalous or malicious behavior, charge a subscriber for data transfer over network 100 or a portion thereof, and/or enforce various quality of service restrictions and guarantees. Numerous additional or alternative functions for node A 140 will be apparent to those of skill in the art.

Node B 150 may also be a device that provides some network service. As illustrated, node B 150 is an off-line device which receives packets transmitted between NAT device 120 and destination 130. For example, node B 150 may monitor traffic for anomalous or malicious behavior, charge a subscriber for data transfer over network 100 or a portion thereof, and/or enforce various quality of service restrictions and guarantees. Numerous additional or alternative functions for node B 150 will be apparent to those of skill in the art. Node A 140 and node B 150 may perform the same function or different functions. Further, node A 140 and node B 150 may cooperate to perform an aggregate function. Following with the previous example, node B 150 may monitor flows to identify flows that should be restricted while node A 140 may perform the restriction for the flows identified by node B 150.

In various contexts, node A 140 and node B 150 may wish to communicate regarding a particular flow. For example, node B 150 may wish to instruct node A 140 to restrict the flow between source 110 and destination 130. However, if node B 150 identifies the flow in part as originating from the 2-tuple "135.1.12.2.13/5478," node A 140 may be unable to identify this flow because the 2-tuple is unknown to node A 140. Instead, node A 140 has seen a different 2-tuple: "192.168.1.1/1234."

According to various embodiments, node A 140 and node B 150 may be adapted to communicate with each other to resolve a common identifier for a flow. Thus, node A 140 and node B 150 may communicate via NAT device 120 or via some other communication path.

The devices and methods described herein may be applicable to various modifications of network 100, as will be apparent to those of skill in the art. For example, node A 140 and/or node B 150 may be intermediate devices between NAT device 120 and source 110 and/or destination 130, respectively. For example, node A 140 may be a router that forwards packets between source 110 and NAT device 120. As another example, node A 140 and/or node B 150 may not be present and the functions described herein may be performed, instead, by source 110 and/or destination 130, respectively.

Having described the components of exemplary network 100, a brief summary of the operation of network 100 will be provided. It should be apparent that the following description is intended to provide an overview of the operation of network 100 and is therefore a simplification in some respects. The detailed operation of network 100 will be described in further detail below in connection with FIGS. 2-8.

As previously described, source 110 may be currently sending a number of packets to destination 130 via NAT device 120. As such, the private source 2-tuple "192.168.1.2/1234" in each of these packets may be changed to the public source 2-tuple "135.112.2.13/5478" by NAT device 120. As packets are transmitted, node A 140 may receive at least some of these packets and cache either address information from the packets or the packets themselves for later address mapping.

Node B 150 may also receive these packets after they have been modified by NAT device 120. Node B 150 may extract the public 2-tuple from one of the packets and determine that it does not yet have an associated private 2-tuple. As such, node B 150 constructs a message to request the private 2-tuple from node A 140. In doing so, node B 150 may identify the flow using information that was not modified by NAT device 120. In various embodiments, node B 150 may forward an unmodified packet, a number of packet fields, and/or a hash of a portion of the packet to identify the flow to node A.

Upon receiving the request from node B 150, node 140 may undertake to identify the relevant flow. Using the identification information forwarded by node B 150, node A 140 may locate one or more of the previously cached packets or address information. For example, if node B 150 forwarded an unmodified packet, node A 140 may extract one or more fields that were not modified by NAT device 120 to identify the previously cached packet. In various embodiments, node A 140 may additionally perform a hash function with respect to one or more fields that were not modified by NAT device 120 to generate an identifier for the packet. In various embodiments wherein node A 140 uses such a hash to identify a matching cached packet, node A 140 may presently calculate or may have previously calculated a similar hash value for one or more of the previously cached packets. In such embodiments, a cached packet is identified as matching a requests from node B 150 when the hash for the cached packet matches a hash carried by or generated using the request message.

Next, node A 140 may construct a response message including the public 2-tuple (if included in the request message) and the private 2-tuple (as read from the cache). When node B 150 receives the response message, node B 150 can update its mapping between the public and private 2-tuples.

Figures 2, 3:
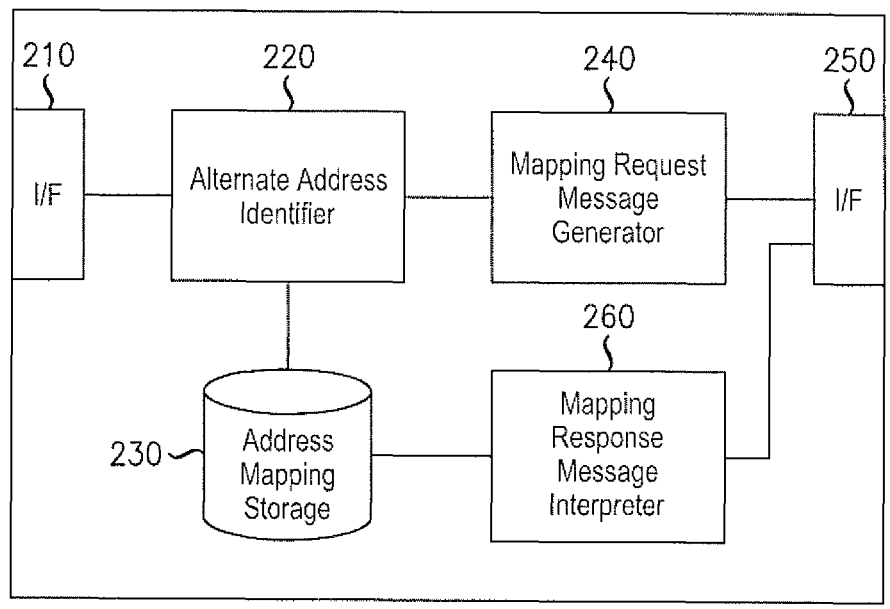
FIG. 2 illustrates an exemplary network node for requesting address mapping information.
FIG. 3 illustrates an exemplary data arrangement for storing address mapping information.

FIG. 2 illustrates an exemplary network node 200 for requesting address mapping information. Node 200 may correspond to source 110, destination 130, node A 140, and/or node B 150 of exemplary network 100. Node 200 may include interface 210, alternate address identifier 220, address mapping storage 230, mapping request message generator 240, interface 250, and mapping response message interpreter 260.

Interface 210 may be an interface comprising hardware and/or executable instructions encoded on a machine-readable storage medium configured to communicate with other network nodes. For example, if node 200 corresponds to node B 150, node 200 may communicate with NAT device 120 and/or destination 130 via interface 210. In various embodiments, interface 210 may be a network interface such as, for example, an Ethernet interface.

Alternate address identifier 220 may include hardware and/or executable instructions on a machine-readable storage medium configured to receive a packet via interface 210 and determine whether an alternate address is known for an endpoint of the flow. For example, if node 200 corresponds to node B 150, alternate address identifier may determine whether node 200 already knows the private address for source 110. Alternate address identifier 220 may make this determination by accessing address mapping storage 230 and determining whether a record associated with the flow or with the public address for source 110 indicates a private address.

Various methods may be employed to locate an appropriate record in address mapping storage for a particular packet or flow. For example, each record in address mapping storage 230 may be identified by a flow identifier. Such flow identifier may be calculated, for example, by performing a hash function on a 5-tuple identifying the flow. As will be understood to those of skill in the art, a 5-tuple may include the destination IP address, destination port, source IP address, source port, and protocol as identified in the packet header. Thus, depending on the network topology, this 5-tuple may include a private address and port or a public address and port. For example, in the case of node B 150, this 5-tuple would be based on the public source address and source port for source 110. Accordingly, to access an appropriate record, alternate address identifier 220 may calculate this hash and locate a record that carries a matching flow identifier.

If alternate address identifier 220 determines that node 200 already knows the alternate address for a particular flow, alternate address identifier 220 may take no further action. Alternatively, alternate address identifier 220 may indicate to another component (not shown) that further, node-specific action may be performed. If on the other hand, alternate address identifier 220 determines that the alternate address is not known to node 200, alternate address identifier 220 may indicate to mapping request message generator 240 that such alternate address should be determined.

Address mapping storage 230 may be any machine-readable medium capable of storing mappings between network addresses. Accordingly, address mapping storage 230 may include a machine-readable storage medium such as read-only memory (ROM), random-access memory (RAM), magnetic disk storage media, optical storage media, flash-memory devices, and/or similar storage media. An exemplary organization of address mapping storage 230 is described in greater detail below with respect to FIG. 3.

Mappings stored in address mapping storage 230 may be removed in some situations to account for changing addresses. For example, each mapping may be removed after the passage of a configurable time-to-live period. As another example, a mapping may be removed after the passage of a configurable timeout period without any related flow activity. As yet another example, a mapping may be removed upon receiving a message from a partner node indicating a change in the network session, such as subscriber registration or deregistration. Various additional conditions under which mappings should be removed from address mapping storage 230 will be apparent to those of skill in the art.

Mapping request message generator 240 may include hardware and/or executable instructions on a machine-readable storage medium configured to generate a request for an alternate address. In various embodiments, such request may include an application-layer message that identifies itself as a request message and includes some information that may be used to identify the flow of interest. In various embodiments, the request message may include the entirety of the packet. In other embodiments, wherein node 200 knows the fields that a partner node will use to identify a flow, the request message may include only those fields or a hash of those fields. It should be apparent that, in various embodiments wherein only portions of a packet and/or a hash value are used to identify a packet between nodes, those nodes should agree on which portions and/or hash functions should be used to identify the packet to ensure proper communication. Once the message is constructed, mapping request message generator 240 may transmit the message to a partner node via interface 250.

Interface 250 may be an interface comprising hardware and/or executable instructions encoded on a machine-readable storage medium configured to communicate with other network nodes. For example, if node 200 corresponds to node B 150, node 200 may communicate with node A 140 via interface 250. In various embodiments, interface 250 may be a network interface such as, for example, an Ethernet interface. It should be apparent that in many embodiments one interface may be operable to perform the functions of both interface 210 and interface 250. Accordingly, interface 250 may be the same as interface 210.

Mapping response message interpreter 260 may include hardware and/or executable instructions on a machine-readable storage medium configured to extract an alternate address from a mapping response message and store the mapping in address mapping storage 230. After mapping request message generator 240 transmits a request message, the partner node may respond with a mapping response message. Such response message may be an application-layer packet identifying itself as a response and identifying a mapping between two addresses. In various embodiments, this mapping may include a public 2-tuple and corresponding private 2-tuple. Mapping response message interpreter may extract the mapping information from the response message and store this data in an appropriate record in address mapping storage. Such appropriate record may be located in the same manner as employed by alternate address identifier 220, described above. Optionally, mapping response message interpreter may then indicate to another component (not shown) that additional and/or node-specific functions may now be performed with respect to the flow.

FIG. 3 illustrates an exemplary data arrangement 300 for storing address mapping information. Data arrangement 300 may be a table in a database or cache such as address mapping storage 230. Alternatively, data arrangement 300 may be a series of linked lists, an array, or a similar data structure. Thus, it should be apparent that data arrangement 300 is an abstraction of the underlying data; any data structure suitable for storage of this data may be used. Data arrangement may include a number of fields such as flow ID field 310, private address field 320, and public address field 330.

Flow ID field 310 may indicate a unique identifier for each flow. Such identifier may be calculated, for example, by performing a hash function on a 5-tuple that describes the flow. As described above, depending on the network topology, this 5-tuple may include a private address and port or a public address and port. Private address field 320 may store a private address associated with an endpoint of the flow. Conversely, public address field 330 may store a public address associated with the same endpoint of the flow. Data arrangement may contain numerous additional fields (not shown). In various embodiments, an address may be used as a unique identifier, in which case, flow ID field 310 may not be present.

As an example, mapping record 340 indicates that a flow identified by identifier "0x5F65" is associated with a private address "192.168.1.4122" and a public address of "135.112.2.13/47." As another example, mapping record 350 indicates that the flow identified by identifier "0x6231" is associated with a private address "192.168.1.3/80" and public address "135.112.2.13/80." Data arrangement 300 may contain numerous additional mapping records.

In various embodiments, data arrangement may be sorted based on one or more fields. In the illustrated example, data arrangement 300 may be sorted in ascending order based on flow ID field 310. To further improve performance, in various embodiments, data arrangement 300 may be implemented as a hash table or content addressable memory.

Figure 4:
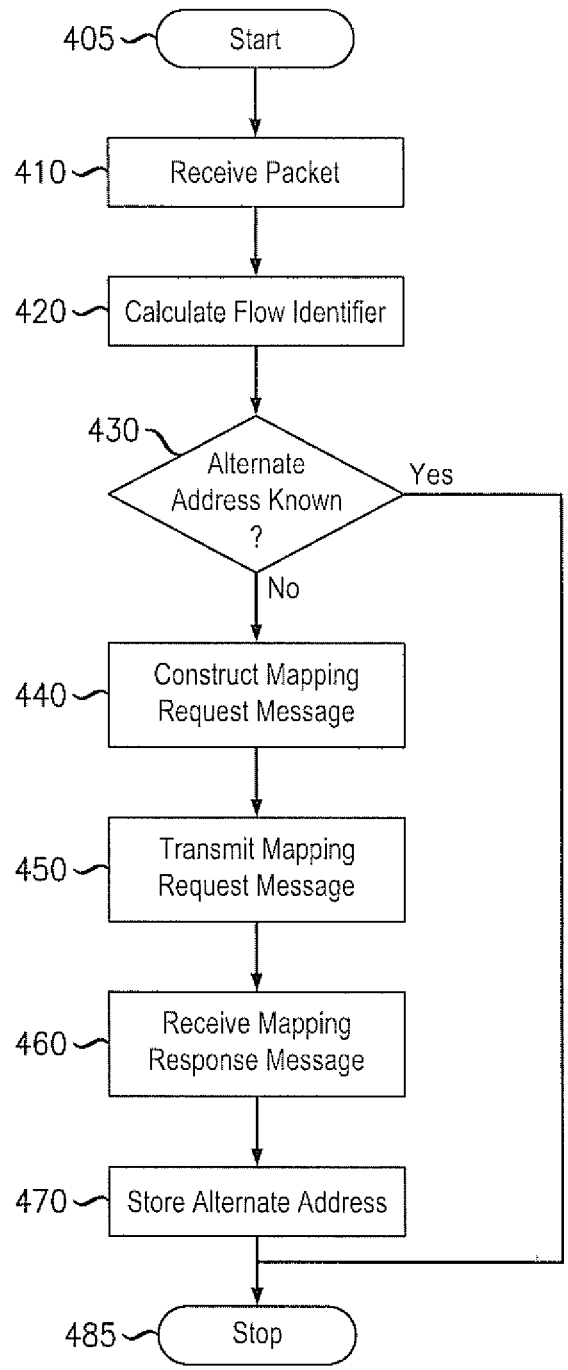
FIG. 4 illustrates an exemplary method for requesting address mapping information.

FIG. 4 illustrates an exemplary method 400 for requesting address mapping information. Method 400 may be performed by the components of node 200 such as alternate address identifier 220, mapping request message generator 240, and/or mapping response message interpreter 260.

Method 400 may begin in step 405 and proceed to step 410 where node 200 receives a packet from another device. Then, in step 420, node 200 uses one or more fields in the packet to calculate a flow identifier in step 420. Node 200 uses this flow identifier to determine, in step 430, whether an alternate address for one of the flow endpoints is known to node 200. It should be apparent that other methods may be used for making this determination. For example, instead of calculating a flow identifier, node 200 may simply use the field data itself to search through its records of address mapping data.

If the alternate address is already known, method 400 may proceed directly to end in step 485. However, if the alternate address is not yet known, method 400 may instead proceed to step 440. In step 440, node 200 may construct a request message. This request message may include an identifier for the flow such as, for example, one or more packets, one or more packet fields, or a hash of at least a portion of a packet. In step 460, node 200 transmits the request message to a partner node and, in step 470, node 200 receives a response message from the partner node. Node 200 then extracts the alternate address information from the response message and stores this address in association with the address carried by the originally received packet. Thereafter, the mapping between the two addresses may be used for node-specific functions.

Figures 5, 6:
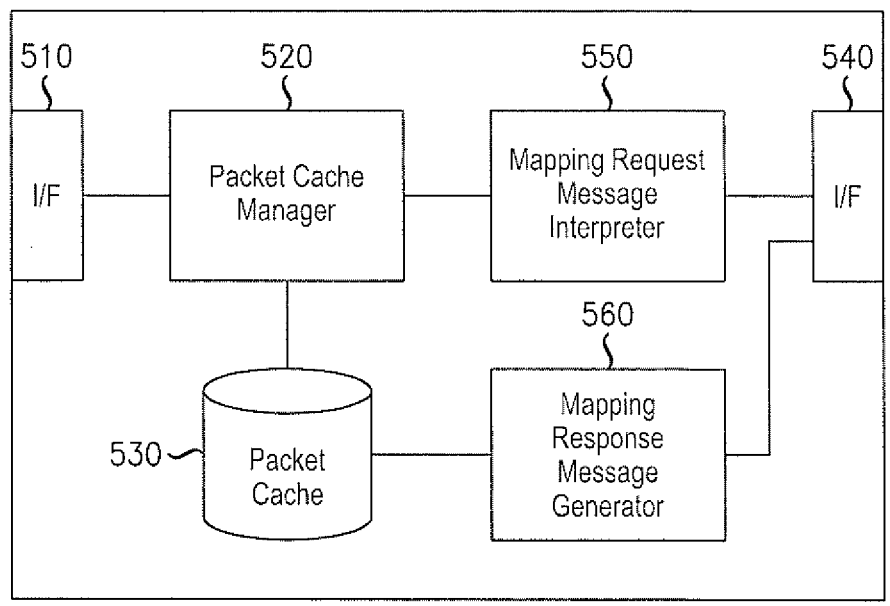
FIG. 5 illustrates and exemplary network node for providing address mapping information.
FIG. 6 illustrates an exemplary data arrangement for caching address information.

FIG. 5 illustrates and exemplary network node 500 for providing address mapping information. Node 500 may correspond to source 110, destination 130, node A 140, and/or node B 150 of exemplary network 100. Node 500 may include interface 510, packet cache manager 520, packet cache 530, interface 540, mapping request message interpreter 550, and mapping response message generator 560.

Interface 510 may be an interface comprising hardware and/or executable instructions encoded on a machine-readable storage medium configured to communicate with other network nodes. For example, if node 500 corresponds to node A 140, node 500 may communicate with source 110 and/or NAT device 120 via interface 510. In various embodiments, interface 510 may be a network interface such as, for example, an Ethernet interface.

Packet cache manager 520 may include hardware and/or executable instructions on a machine-readable storage medium configured to manage the data stored in packet cache 530. Packet cache manager 520 may receive various packets via interface 510 and decide whether to cache the packets or information they contain. In various embodiments, packet cache manager 520 may cache each packet it receives or may decide to only cache certain packets such as, for example, the first packet of each flow. For ease of later access, packet cache manager 520 may store each cached packet in connection with a packet or other identifier. For example, packet cache manager 520 may perform a hash function on the destination address, destination port, and fragment identifier to produce a packet identifier. Packet cache manager may then store this identifier together with the packet or a number of fields extracted from the packet in packet cache 530.

Packet cache manager 520 may also clear cache entries after the passage of a certain amount of time or when the cache is full. For example, packet cache manager 520 may clear each entry after it has been stored in the packet cache for 10 seconds. Alternatively, packet cache manager 520 may simple flush the oldest entries periodically. A number of cache management algorithms may be applicable, as will be apparent to those of skill in the art.

Packet cache 530 may be any machine-readable medium capable of storing packets and/or information gleaned from packets. Accordingly, packet cache 530 may include a machine-readable storage medium such as read-only memory (ROM), random-access memory (RAM), magnetic disk storage media, optical storage media, flash-memory devices, and/or similar storage media. An exemplary organization of packet cache 530 is described in greater detail below with respect to FIG. 6.

Interface 540 may be an interface comprising hardware and/or executable instructions encoded on a machine-readable storage medium configured to communicate with other network nodes. For example, if node 200 corresponds to node A 140, node 200 may communicate with node B 150 via interface 540. In various embodiments, interface 540 may be a network interface such as, for example, an Ethernet interface. It should be apparent that in many embodiments one interface may be operable to perform the functions of both interface 510 and interface 540. Accordingly, interface 540 may be the same as interface 510.

Mapping request message interpreter 550 may include hardware and/or executable instructions on a machine-readable storage medium configured to receive and process mapping request messages received from a partner node via interface 540. Such request messages may be application-layer messages that include information that may be used to identify a flow. Mapping request message interpreter 550 may calculate a packet identifier from this information in the same manner as packet cache manager 520. In various alternative embodiments, mapping request message interpreter 550 may not calculate a packet identifier and, instead, use the information in the request message to query packet cache 530. Regardless of the method used, mapping request message interpreter 550 uses the received request message to locate a cached packet or packet information in packet cache 530. Once mapping request message interpreter 550 locates this information, mapping request message interpreter 550 indicates to mapping response message generator 560 that a response should be transmitted.

Mapping response message generator 560 may include hardware and/or executable instructions on a machine-readable storage medium configured to construct and transmit a mapping response message. This message may be, for example, an application-layer packet that identifies itself as such a response message. Mapping response message generator 560 may insert the address information retrieved by mapping request message interpreter 550 into the response message. In various embodiments, mapping response message generator 560 may also include information that may be used by the partner node to identify the flow to which the response message applies. For example, if the original request message included a source address, response message generator 560 may include this information in the response. Once the response message is generated, mapping response message generator 560 may transmit the response message to the partner node via interface 540.

FIG. 6 illustrates an exemplary data arrangement 600 for caching address information. Data arrangement 600 may be a table in a database or cache such as packet cache 530. Alternatively, data arrangement 600 may be a series of linked lists, an array, or a similar data structure. Thus, it should be apparent that data arrangement 600 is an abstraction of the underlying data; any data structure suitable for storage of this data may be used. Data arrangement may include a number of fields such packet ID field 610 and private address field 620.

Packet ID field 610 may indicate a unique identifier for each packet. Such identifier may be calculated, for example, by performing a hash function on portions of a packet that would not be modified by a NAT device. For example, the identifier may be calculated based on a destination address, destination port, and fragment identifier. Private address field 620 may store a private address associated with an endpoint of the flow. Data arrangement 600 may contain numerous additional fields (not shown). For example, data arrangement 600 may include a field for storing an entire packet. In various embodiments, other information, such as a private address may be used as a unique identifier, in which case, packet ID field 610 may not be present.

As an example, packet record 640 is associated with a packet identified by ID "0x4E3D," which carried a private source address of "192.168.1.4/22." As a further example, packet record 650 is associated with a packet identified by ID "0x502B," which carried a private source address of "192.168.1.3/80." As yet another example, packet record 660 is associated with a packet identified by ID "0x7AD3," which carried a private source address of "192.168.1.2.1234." Data arrangement 600 may contain numerous additional entries, 670.

In various embodiments, data arrangement 600 may be sorted based on one or more fields. In the illustrated example, data arrangement 600 may be sorted in ascending order based on packet ID field 610. To further improve performance, in various embodiments, data arrangement 600 may be implemented as a hash table or content addressable memory.

Figure 7:
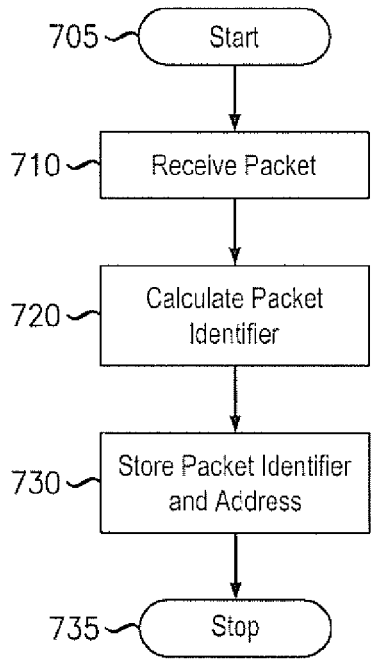
FIG. 7 illustrates an exemplary method for caching address information.

FIG. 7 illustrates an exemplary method 700 for caching address information. Method 700 may be performed by the components of node 500 such as packet cache manager 520.

Method 700 may begin in step 705 and proceed to step 710 where node 500 may receive a packet. In step 720, node 500 calculates a packet identifier by, for example, performing a hash function on one or more fields of the packet. Next, in step 730, node 500 may store the packet identifier and address information together for later use. Finally, method 700 may end in step 735.

Figure 8:
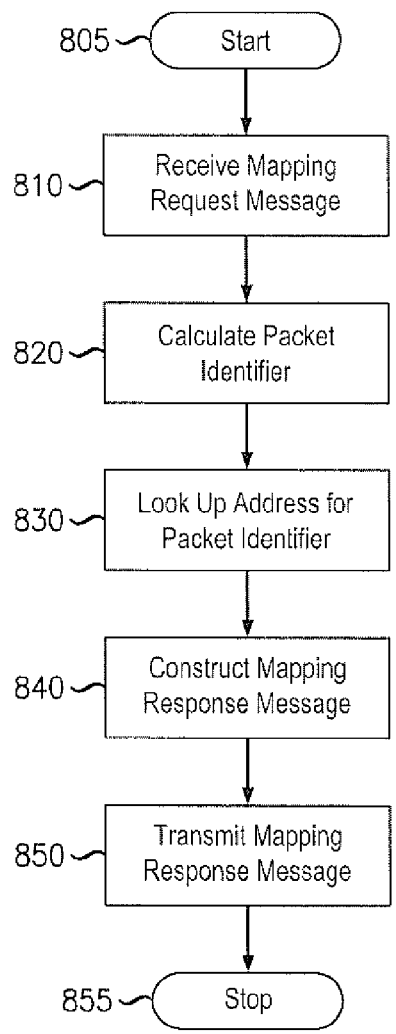
FIG. 8 illustrates an exemplary method for providing address mapping information.

FIG. 8 illustrates an exemplary method 800 for providing address mapping information. Method 800 may be performed by the components of node 500 such as mapping request message interpreter 550 and/or mapping response message generator 560.

Method 800 may begin in step 805 and proceed to step 810 where node 500 may receive a mapping request message from a partner node. Node 500 may then, in step 820, calculate a packet identifier using information carried by the request message. Then, in step 830, node 500 may look up address information associated with the packet identifier. In various embodiments wherein node 500 caches full packets, node 500 may extract the address information from the previously stored packet in this step. Once the address information is retrieved, method 800 may proceed to step 840, where node 500 may construct a mapping response message. Such response message may include the retrieved address information as well as additional information carried by the initial request message for the purposes of identification by the partner node. Node 500 may then transmit the response message to the partner node in step 850 and method 800 may end 5n step 865.

Having described exemplary components and methods for the operation of exemplary network 100, an example of the operation of exemplary network 100 will now be provided with reference to FIGS. 1-8. Node 200 may correspond to node B 150; node 500 may correspond to node A 140; data structure 300 may describe the contents of address mapping storage 230; and data structure 600 may describe the contents of packet cache 530.

The process begins when source 110 may send a packet to destination 130. When node A 140 may see this packet, packet cache manager 520 may calculate a packet identifier by performing a hash function on the destination address, destination port, and fragment identifier carried by the packet, to produce a packet identifier of "0x7AD3." Packet cache manager 520 also may extract the source address and source port from the packet. Packet cache manager 520 may store this information together as packet record 660 in packet cache 530.

The packet may be forwarded by NAT device 120 toward destination 130. Before forwarding the packet, however, NAT device 120 may replace the source address and port with the public address and port "135.112.2.13/5478." Later, when node B 150 receives the packet, alternate address identifier 220 may determine that address mapping storage 230 does not contain a mapping for address "135.112.2.13/5478." Accordingly, mapping request message generator 240 may construct a request message and may insert the packet into this message. Mapping request message generator 240 then may transmit the request message to the partner node, node A 140.

Upon node A 140 receiving the request message, mapping request message interpreter 550 may calculate a packet identifier. In particular mapping request message interpreter 550 may extract the packet from the request message and may perform a hash function on the destination address, destination port, and fragment identifier. Because the NAT device did not modify any of these fields, the packet identifier may be the same as when it was previously calculated, or "0x7AD." Mapping request message interpreter 550 then may retrieve packet record 660. Mapping response message generator 560 then may construct a mapping response message, including the private address "192.168.1.2/1234," as extracted from packet record 660, and the public address, "135.112.2.13/5478," as carried by the request message. Mapping response message generator 560 then may transmit the response back to the partner node, node B 150.

Node B 150 then may receive the response message and mapping response message interpreter 260 may extract the mapping from the message. Mapping response message interpreter 260 then may store the private address and public address information in address mapping storage 230 for future use.

According to the foregoing, various exemplary embodiments provide for a node that may determine descriptive information that is used in a different part of a network, such as a private address. In particular, by identifying a flow based on information that is not modified by other nodes in transit, a node may request such descriptive information from a partner node. Further, the partner node may use the provided identification information to identify previously seen packets and extract the requested information.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node for determining an alternate address mapping, the method comprising:
   identifying, at the network node, a packet associated with a first address;
   determining independent of a NAT device, at the network node, when an alternate address mapping is unknown to the network node for the first address;
   generating a request message based on at least a portion of the packet, where the at least a portion of the packet does not comprise the first address;
   transmitting the request message to a different node independent of a NAT device; and
   receiving a response message, the response message including a second address, wherein the second address is an alternative address for the first address.

2. The method of claim 1, wherein the request message includes at least one of the packet, at least one additional packet, at least one field of the packet, and a hash of at least a portion of the packet.

3. The method of claim 1, wherein:
   at least one of the network node and the different node is at least one of a source and a destination for the packet.

4. The method of claim 1, wherein:
   the first address is associated with the packet on a first side of a first network address translation (NAT) device; and
   the second address is associated with the packet on a second side of a second NAT device.

5. The method of claim 4, wherein the first NAT device and the second NAT device are the same device.

6. The method of claim 1, wherein:
   the first address includes a first IP address and a first port; and
   the second address includes a second IP address and a second port.

7. A network node adapted to determine an alternate address mapping, the network node comprising:
   an address mapping storage for storing at least one mapping between two addresses;
   an interface for communicating with a different node independent of a NAT device;
   an alternate address identifier for:
      identifying a packet associated with a first address, and
      determining independent of a NAT device when the address mapping storage does not store a mapping for the first address;
   a request message generator for:
      generating a request message based on at least a portion of the packet, where the at least a portion of the packet does not comprise the first address, and
      transmitting the request message to the different node via the interface; and
   a response message interpreter for:
      receiving a response message from the different node via the interface, the response message including a second address, wherein the second address is an alternative address for the first address.

8. The network node of claim 7, wherein the request message includes at least one of the packet, at least one additional packet, at least one field of the packet, and a hash of at least a portion of the packet.

9. The network node of claim 7, wherein:
   at least one of the network node and the different node is at least one of a source and a destination for the packet.

10. The network node of claim 7, wherein:
   the first address is associated with the packet on a first side of a first network address translation (NAT) device; and
   the second address is associated with the packet on a second side of a second NAT device.

11. The network node of claim 10, wherein the first NAT device and the second NAT device are the same device.

12. The network node of claim 7, wherein:
   the first address includes a first IP address and a first port; and
   the second address includes a second IP address and a second port.

13. A non-transitory machine-readable storage medium encoded with instructions for execution by a network node for determining an alternate address mapping, the machine-readable storage medium comprising:
   instructions for identifying, at the network node, a packet associated with a first address;
   instructions for determining independent of a NAT device, at the network node, when an alternate address mapping is unknown to the network node for the first address;
   instructions for generating a request message based on at least a portion of the packet, where the at least a portion of the packet does not comprise the first address;
   instructions for transmitting the request message to a different node independent of a NAT device;
   instructions for receiving a response message, the response message including a second address, wherein the second address is an alternative address for the first address; and
   instructions for storing the first address and the second address together as an alternate address mapping.

14. The non-transitory machine-readable storage medium of claim 13, wherein the request message includes at least one of the packet, at least one additional packet, at least one field of the packet, and a hash of at least a portion of the packet.

15. The non-transitory machine-readable storage medium of claim 13, wherein:
   at least one of the network node and the different node is at least one of a source and a destination for the packet.

16. The non-transitory machine-readable storage medium of claim 13, wherein:
   the first address is associated with the packet on a first side of a first network address translation (NAT) device; and
   the second address is associated with the packet on a second side of a second NAT device.

17. The non-transitory machine-readable storage medium of claim 16, wherein the first NAT device and the second NAT device are the same device.

18. The non-transitory machine-readable storage medium of claim 13, wherein:
the first address includes a first IP address and a first port; and
the second address includes a second IP address and a second port.

19. A method performed by a network node for determining an alternate address mapping, the method comprising:
receiving, at the network node from a different node, a request message, the request message including an indication of a packet and a first address;
identifying a second address associated with the packet based on the indication of the packet;
constructing a response message, the response message including the first address and the second address; and
transmitting the response message to the different node.

20. The method of claim 19, wherein the indication of a packet is at least one of: the packet itself, a portion of the packet, at least one header field from the packet, and a hash of at least a portion of the packet.

21. The method of claim 19, wherein the step of identifying the first address comprises:
performing a hash function on at least a part of the indication of the packet to produce a hash key; and
using the hash key to locate a packet that was cached having a matching hash.

22. The method of claim 19, wherein:
the response message is an application-layer packet.

23. The method of claim 19, wherein at least one of the network node and the different node is at least one of a source and a destination for the packet.

24. The method of claim 19, further comprising:
before receiving the request message, receiving the packet;
storing at least a portion of the packet in a packet cache,
wherein the step of identifying a first address associated with the packet comprises extracting the first address from the at least a portion of the packet.

25. The method of claim 19, wherein the indication of the packet includes fields from a packet that are not modified by a network address translation device.

26. A network node for determining an alternate address mapping, the network node comprising:
a packet cache for storing a number of packets;
an interface for communicating with a different node;
a request message interpreter for:
receiving, from a different node via the interface, a request message, the request message including an indication of a packet and a first address,
identifying a second address associated with the packet based on the indication of the packet; and
a response message generator for:
constructing a response message, the response message including the first address and the second address, and
transmitting the response message to the different node.

27. The network node of claim 26, wherein the indication of a packet is at least one of: the packet, a portion of the packet, at least one header field from the packet, and a hash of at least a portion of the packet.

28. The network node of claim 26, wherein, in identifying the first address, the a request message interpreter:
performs a hash function on at least a part of the indication of the packet to produce a hash key; and
uses the hash key to locate a packet that was cached having a matching hash.

29. The network node of claim 26, wherein:
the response message is an application-layer packet.

30. The network node of claim 26, wherein at least one of the network node and the different node is at least one of a source and a destination for the packet.

31. The network node of claim 26, further comprising:
a packet cache manager for:
before receiving the request message, receiving the packet;
storing at least a portion of the packet in a packet cache,
wherein the step of identifying a first address associated with the packet comprises extracting the first address from the at least a portion of the packet.

32. The network node of claim 26, wherein the indication of the packet includes fields from a packet that are not modified by a network address translation device.

33. A non-transitory machine-readable storage medium encoded with instructions for execution by a network node for determining an alternate address mapping, the machine-readable storage medium comprising:
instructions for receiving, at the network node from a different node, a request message, the request message including an indication of a packet and a first address;
instructions for identifying a second address associated with the packet based on the indication of the packet;
instructions for constructing a response message, the response message including the first address and the second address; and
instructions for transmitting the response message to the different node.

34. The non-transitory machine-readable storage medium of claim 33, wherein the indication of a packet is at least one of: the packet, a portion of the packet, at least one header field from the packet, and a hash of at least a portion of the packet.

35. The non-transitory machine-readable storage medium of claim 33, wherein the step of identifying the first address comprises:
performing a hash function on at least a part of the indication of the packet to produce a hash key; and
using the hash key to locate a packet that was cached having a matching hash.

36. The non-transitory machine-readable storage medium of claim 33, wherein:
the response message is an application-layer packet.

37. The non-transitory machine-readable storage medium of claim 33, wherein at least one of the network node and the different node is at least one of a source and a destination for the packet.

38. The non-transitory machine-readable storage medium of claim 33, further comprising:
before receiving the request message, receiving the packet;
storing at least a portion of the packet in a packet cache,
wherein the step of identifying a first address associated with the packet comprises extracting the first address from the at least a portion of the packet.

39. The non-transitory machine-readable storage medium of claim 33, wherein the indication of the packet includes fields from a packet that are not modified by a network address translation device.

* * * * *